US011509565B2

(12) United States Patent
Alimohammadifar et al.

(10) Patent No.: US 11,509,565 B2
(45) Date of Patent: Nov. 22, 2022

(54) NETWORK LINK VERIFICATION

(71) Applicants: Amir Alimohammadifar, Montreal (CA); Lingyu Wang, Montreal (CA); Yosr Jarraya, Montreal (CA); Makan Pourzandi, Montreal (CA); Mourad Debbabi, Dollard des Ormeaux (CA)

(72) Inventors: Amir Alimohammadifar, Montreal (CA); Lingyu Wang, Montreal (CA); Yosr Jarraya, Montreal (CA); Makan Pourzandi, Montreal (CA); Mourad Debbabi, Dollard des Ormeaux (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 16/768,150

(22) PCT Filed: Dec. 4, 2018

(86) PCT No.: PCT/IB2018/059632
§ 371 (c)(1),
(2) Date: May 29, 2020

(87) PCT Pub. No.: WO2019/111154
PCT Pub. Date: Jun. 13, 2019

(65) Prior Publication Data
US 2020/0374210 A1  Nov. 26, 2020

Related U.S. Application Data

(60) Provisional application No. 62/594,369, filed on Dec. 4, 2017.

(51) Int. Cl.
*H04L 45/02* (2022.01)
*H04L 41/12* (2022.01)

(52) U.S. Cl.
CPC .............. *H04L 45/02* (2013.01); *H04L 41/12* (2013.01)

(58) Field of Classification Search
USPC .......................................... 370/254; 709/200
See application file for complete search history.

(56) References Cited

U.S. PATENT DOCUMENTS 6,298,043 B1 * 10/2001 Mauger ............... H04L 12/5601
370/254
7,016,313 B1    3/2006 Harper
(Continued)

FOREIGN PATENT DOCUMENTS

EP           2947828 A1    11/2015
WO        2017072614 A1     5/2017

OTHER PUBLICATIONS

Open Networking Foundation, OpenFlow Switch Specification, https://opennetworking.org/wp-content/uploads/2014/10/openflow-switch-v1.5.1.pdf, Version 1.5.1, ONF TS-025, Mar. 26, 2015, 283 pages.

(Continued)

*Primary Examiner* — Anthony Mejia
(74) *Attorney, Agent, or Firm* — Ericsson Canada Inc.; David Rahmer

(57) ABSTRACT

Systems and methods for verifying the validity of a network link are described herein. A verification packet and an associated packet handling flow can be generated and added to a network in order to investigate a link between network nodes (e.g. switches).

22 Claims, 11 Drawing Sheets

(56) References Cited

U.S. PATENT DOCUMENTS

| | | | | |
|---|---|---|---|---|
| 8,339,991 | B2* | 12/2012 | Biswas | H04L 29/1232 370/338 |
| 8,908,539 | B1* | 12/2014 | Pani | H04L 43/0811 370/248 |
| 9,038,151 | B1* | 5/2015 | Chua | H04L 47/10 726/1 |
| 10,757,020 | B2* | 8/2020 | Morris | H04L 45/02 |
| 2005/0259587 | A1* | 11/2005 | Wakumoto | H04L 43/50 370/254 |
| 2006/0126495 | A1* | 6/2006 | Guichard | H04L 45/22 370/216 |
| 2012/0155467 | A1 | 6/2012 | Appenzeller | |
| 2013/0229909 | A1* | 9/2013 | Rahman | H04L 41/0695 370/216 |
| 2013/0286893 | A1* | 10/2013 | Zhu | H04L 45/64 370/254 |
| 2014/0269731 | A1* | 9/2014 | DeCusatis | H04L 49/506 370/394 |
| 2016/0087870 | A1* | 3/2016 | Tonouchi | H04L 45/02 370/355 |
| 2016/0119157 | A1* | 4/2016 | Hua | H04L 61/2503 370/312 |
| 2016/0182329 | A1* | 6/2016 | Armolavicius | H04L 41/147 370/230 |
| 2017/0012900 | A1* | 1/2017 | Singamsetty | H04L 45/02 |
| 2017/0171058 | A1* | 6/2017 | Wang | H04L 45/44 |
| 2017/0207976 | A1* | 7/2017 | Rovner | H04L 45/7453 |
| 2017/0339037 | A1* | 11/2017 | Cheh | H04L 41/0668 |
| 2018/0123903 | A1* | 5/2018 | Holla | H04L 45/02 |
| 2018/0375770 | A1* | 12/2018 | Li | H04L 43/0823 |
| 2020/0336430 | A1* | 10/2020 | Kim | H04L 47/2433 |
| 2021/0144082 | A1* | 5/2021 | Bisht | H04L 45/74 |

OTHER PUBLICATIONS

Kreutz et al, Software-Defined Networking: A Comprehensive Survey, http://ieeexplore.ieee.org/abstract/document/6994333, Proceedings of the IEEE, vol. 103, No. 1, Jan. 2015, 63 pages.

Open Networking Foundation, Project Floodlight, http://www.projectfloodlight.org/floodlight, downloaded on Oct. 30, 2017, 3 pages.

Tootoonchian Merge Blog, The NOX Controller, https://github.com/noxrepo/nox, downloaded on Oct. 30, 2017, 2 pages.

Open Networking Foundation, Leveraging Disaggregation to Build Innovative Open Source Solutions for Operator Networks, https://www.opennetworking.org, downloaded on Oct. 30, 2017, 4 pages.

Open VSWITCH, Production Quality, Multilayer Open Virtual Switch, http://openvswitch.org, downloaded on Oct. 30, 2017, 2 pages.

Open Daylight, Nitrogen Released, https://www.opendaylight.org, downloaded on Oct. 30, 2017, 4 pages.

ISR and Written Opinion from corresponding PCT/IB2018/059632, dated Dec. 4, 2018, 15 pages.

Alharbi et al, The (In)Security of Topology Discovery in Software Defined Networks, 40th Annual IEEE Conference, 2015, 4 pages, Florida, USA.

Antikainen et al, Spook in Your Network: Attacking an SDN with a Compromised OpenFlow Switch, Aalto University, Department of Computer Science and Engineering, Finland, 16 pages.

Azzouni et al, sOFTDP: Secure and Efficient Topology Discovery Protocol for SDN, 1LIP6 / UPMC; Paris, France, May 15, 2017, 7 pages.

Azzouni et al, Limitations of OpenFlow Topology Discovery Protocol, 1LIP6 / UPMC; Paris, France, May 12, 2017, 4 pages.

Bui, Analysis of Topology Poisoning Attacks in Software-Defined Networking, Aalto University; School of Science, Jun. 30, 2015, 80 pages, Stockholm, Sweden.

Chi et al, How to Detect a Compromised SDN Switch, IEEE, 2015, 6 pages, Taipei, Taiwan.

Dhawan et al, SPHINX: Detecting Security Attacks in Software-Defined Networks, SDNs imply Open Flow-based SDNs, 15 pages.

Doria et al, Forwarding and Control Element Separation (ForCES); Protocol Specification, Internet Engineering Task Force (IETF), Mar. 2010, 124 pages.

Enns et al, Network Configuration Protocol (NETCONF), Internet Engineering Task Force (IETF), Jun. 2011, 113 pages.

Gude et al, NOX: Towards an Operating System for Networks, ACM SIGCOMM Computer Communication Review, Jul. 2008, 6 pages, vol. 38, No. 3.

Hong et al, Poisoning Network Visibility in Software-Defined Networks: New Attacks and Countermeasures, SDN, 15 pages.

Kaur et al, Mininet as Software Defined Networking Testing Platform, ICCCS, 2014, 4 pages.

Khan et al, Topology Discovery in Software Defined Networks: Threats,Taxonomy, and State-of-the-Art, IEEE Communications Surveys & Tutorials, vol. 19, No. 1, First Quarter 2017, 22 pages.

Kim et al, Efficient Method for Inferring a Firewall Policy, the National Research Foundation of Korea (NRF), 2010, 8 pages.

Vasseur et al, Path Computation Element (PCE) Communication Protocol (PCEP), Mar. 2009, 87 pages.

Lin et al, Inferring OpenFlow Rules by Active Probing in Software-defined Networks, ISBN, Feb. 2017, 6 pages.

McKeown et al, OpenFlow: Enabling Innovation in Campus Networks, ACM SIGCOMM Computer Communication Review, vol. 38, No. 2, Apr. 2008, 6 pages.

Medved et al, Open Daylight: Towards a Model-Driven SDN Controller Architecture, 6 pages.

Pakzad et al, Efficient Topology Discovery in Software Defined Networks, IEEE, 2014, 8 pages.

Pfaff et al, The Open vSwitch Database Management Protocol, Dec. 2013, 35 pages.

Song, Protocol-Oblivious Forwarding: Unleash the Power of SDN through a Future-Proof Forwarding Plane, ACM, Aug. 2013, 6 pages, Hong Kong.

Xia et al, A Survey on Software-Defined Networking, IEEE Communication Surveys & Tutorials, vol. 17, No. 1, First Quarter 2015, 25 pages.

Software-Defined Networking (SDN) Definition, https://www.opennetworking.org/sdn-definition, downloaded on Oct. 30, 2017, 6 pages.

David Erickson Blog, What is Beacon?, https://openflow.stanford.edu/display/Beacon/Home, 2 pages.

Murphy MC Blog, The POX Controller, https://github.com/noxrepo/pox, downloaded on Oct. 30, 2017, 2 pages.

Build SDN Aailely, https://osrg.github.io/ryu, downloaded on Oct. 30, 2017, 2 pages.

* cited by examiner

| PKT_ID | PKT_type | Switch_DPID | PKT_IN_hdr | Payload_hdr | Payload_size | Link_ID | Time stamp |

Packet Database 212

Figure 6

NETWORK LINK VERIFICATION

CROSS REFERENCE TO RELATED APPLICATIONS

This application claims the benefit of U.S. Provisional Application No. 62/594,369 filed on Dec. 4, 2017, the entire contents of which are hereby incorporated by reference.

TECHNICAL FIELD

The present disclosure generally relates to communication networks and verifying the validity of network links.

INTRODUCTION

FIG. 1 illustrates an example of a conventional three-layered Software Defined Networking (SDN) architecture, including a forwarding layer or data plane 100, a control layer or control plane 102, and the application layer 104. The application layer 104 consists of different applications (e.g. networking applications, monitoring applications, and/or other applications) that manage the entire data plane 100 network through the control layer 102. These applications can monitor, secure or implement business applications, for example. The SDN controller(s) 106 are in the control layer 102. The underlying data plane 100 comprises forwarding devices or switches (S1-S24) and the links between them. Some of the switches connect to host devices (H1-H4). There are various commercial and open source implementations of SDN devices. A widely used software-based open source SDN device is the Open vSwitch (OVS).

The above-mentioned layers can communicate through application programming interfaces (APIs). The application 104 and control 102 planes can communicate through a northbound API, which may not be standardized. One commonly used API for the communications between the control plane 102 and the data plane 100 is the OpenFlow protocol (e.g. the southbound API). The OpenFlow specification defines how the SDN controller(s) should communicate with underlying data plane devices (e.g. OpenFlow switches) as well as providing the definition and specification of OpenFlow switches.

Obtaining an accurate view of the network can be critical in SDN as there are topology-dependent applications that communicate with the SDN controller to query the status of the network topology for the purposes of routing, mobility tracking, load balancing, topology-based slicing, etc. Topology discovery in SDN can lead to a correct and reliable spanning tree, topology management, traffic scheduling, robustness, statistical data gathering, resource provisioning, etc. However, malicious hosts or switches can potentially "poison" the view of the network which can cause the controller to obtain an incorrect topology of the network, which may lead to security attacks.

An SDN controller establishes the network topology through interactions with its switches. In an OpenFlow SDN, whenever an OpenFlow switch connects to the network, it establishes a TCP connection with the OpenFlow controller used for communications. After a switch introduces itself to the controller, the controller requests the active ports and their MAC addresses, using the OFTP_FEATURE_REQUEST message. The switch replies with OFTP_FEATURE_REPLY and sends the requested information to the controller. Based on the received information from different switches, the controller can discover the links that connect the switches to each other. Although there is no defined standard for discovering the topology of an OpenFlow-based SDN, controller implementations commonly follow the OpenFlow Discovery Protocol. In this protocol, the SDN controller utilizes Link Layer Discovery Protocol (LLDP) packets to discover switch links throughout the network.

FIG. 2 illustrates as example of the OpenFlow discovery protocol. Note that the following description is exemplary to illustrate the use of the LLDP protocol.

The SDN controller 106a encapsulates an LLDP packet, (an example LLDP packet will be shown in FIG. 3), into OFTP_PACKET_OUT message and sends it to each switch periodically along with the instructions of what to do with the packet (Step 1). The CHASIS_ID and PORT_ID indicate which switch this LLDP packet is destined to. The instructions in the packet instruct switch S11 to advertise the received LLDP packet on all its ports except, for example, for the port on which it has received the packet (Step 2). Switches S13 and S14 send the received LLDP packet, along with their CHASIS_ID and PORT_ID of the port they have received the LLDP packet from, back to the controller 106a (Step 3). Based on this information, the controller 106a can distinguish the link between switches S11 and S13 as well as the link between S11 and S14. To discover other links, the same procedure will be repeated from switches S13 and S14 to switch S11. After discovering the links between the switches, the SDN controller 106a can update its view of the network.

FIG. 3 illustrates an example LLDP packet 110. Each LLDP frame is composed of a header (Destination MAC, Source MAC, EtherType) and a payload LLDP data unit referred to as LLDPDU as described in IEEE 802.1AB-2009 (IEEE Standard for Local and Metropolitan Area Networks—Station and Media Access Control Connectivity Discovery). LLDPDU is composed of mandatory and optional Type Length Value (TLV) structures including CHASSIS ID TLV, Port ID TLV, Time to Live TLV, and OPTIONAL TLV.

Due to the lack of authentication for LLDP packets, malicious hosts or malicious switches can potentially create fake links in the network view of the controller by injecting false LLDP packets or relaying LLDP packets between different switches. There exist different ways to create fake links between OpenFlow switches in an SDN environment, for example by fake LLDP packet injection, relaying LLDP packets using compromised hosts and relaying LLDP packets using compromised switches.

SUMMARY

It is an object of the present disclosure to obviate or mitigate at least one disadvantage of the prior art.

In aspects of the present disclosure, there are provided systems and methods for verifying network links.

In a first aspect of the present disclosure, there is provided a method for link verification by a network controller. The network controller can comprise processing circuitry configured to perform the method. The method includes selecting a link between a first network node and a second network node for verification. The network controller generates a verification packet and a packet handling rule associated with the selected link, the packet handling rule indicating to forward the verification packet towards the second network node. The generated packet handling rule is installed on the first network node. The generated verification packet is injected into a data path of the network. Responsive to receiving a request for packet handling instructions associated with the verification packet from a node other than the second network node, the network controller determines that the link is not verified.

In some embodiments, the link is selected for verification responsive to detecting a network topology change. The network topology change can include an addition of the link between the first network node and the second network node to the network.

In some embodiments, the verification packet is generated based at least in part on a packet previously processed by the network. In some embodiments, the previously processed packet has not been processed by either of the first network node and the second network node. In some embodiments, this can include forging header information from the previously processed packet. The verification packet can be generated to be unique to the selected link.

In some embodiments, installing the generated packet handling rule includes transmitting a control message to the first network node.

In some embodiments, injecting the generated verification packet into the data path of the network includes transmitting the verification packet to the first network node.

In some embodiments, the method further includes waiting a predetermined period of time to receive a request for packet handling instructions associated with the verification packet.

In some embodiments, responsive to receiving a request for packet handling instructions associated with the verification packet from the second network node, it is determined that the link is verified. In other embodiments, responsive to not receiving a request for packet handling instructions associated with the verification packet, it is determined that the link is not verified.

In some embodiments, the network controller can perform an operational task in response to determining that the link is not verified and/or that the link is verified.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein:

FIG. 6 illustrates an example packet database format;

DETAILED DESCRIPTION

Figure 1:
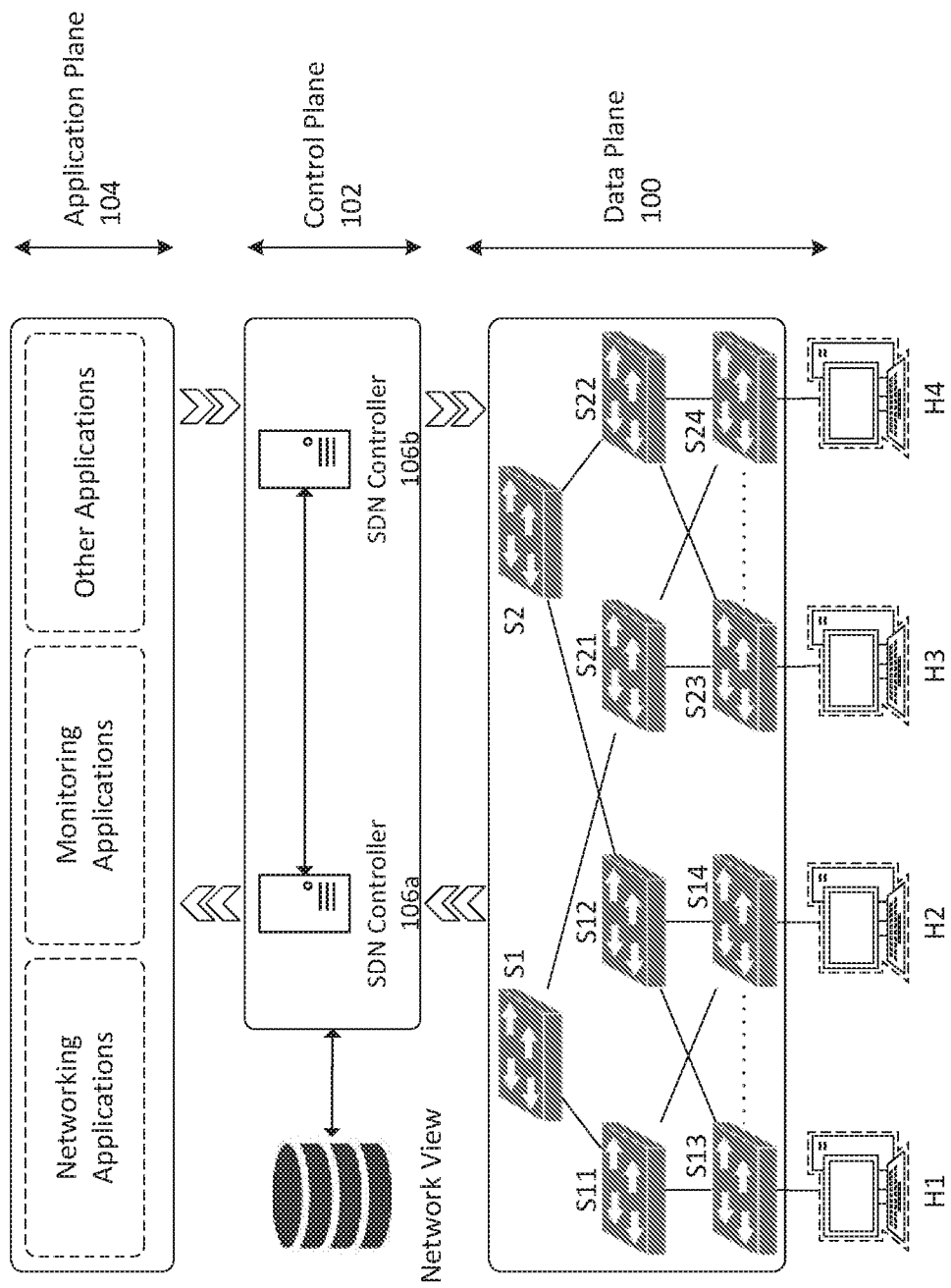
FIG. 1 illustrates an example Software Defined Network architecture.
Figure 2:
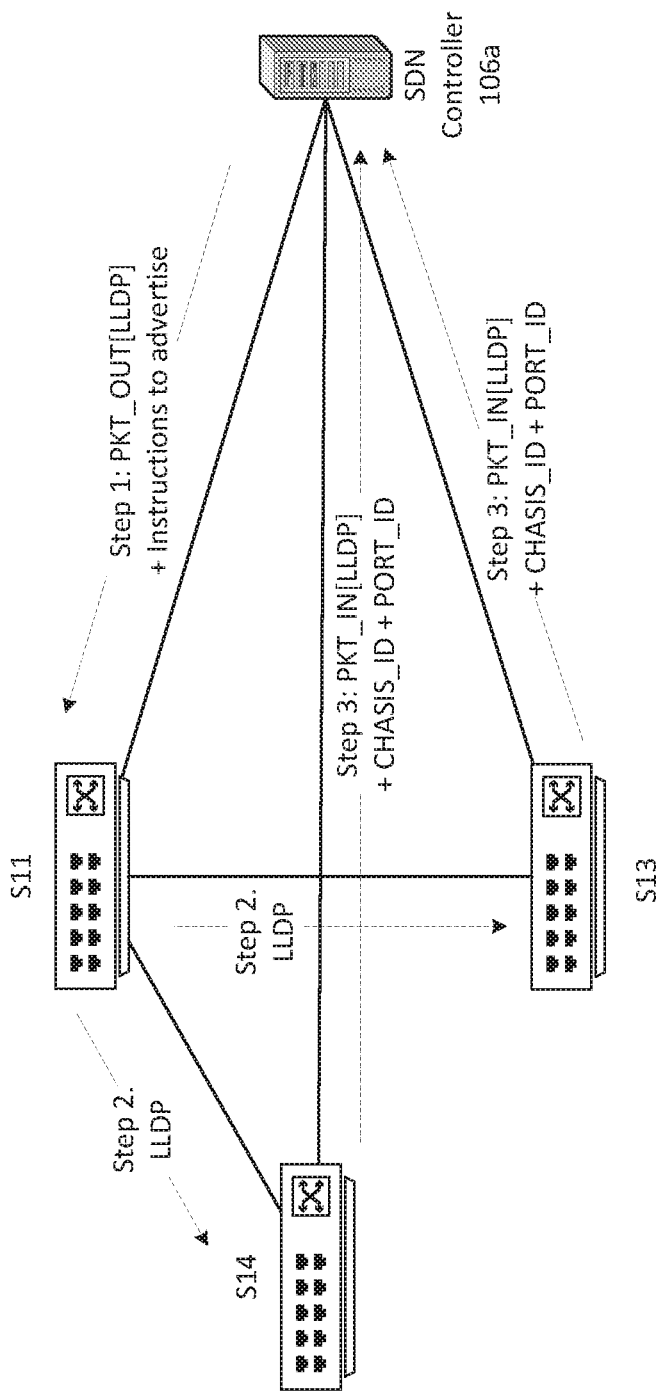
FIG. 2 illustrates as example of the OpenFlow discovery protocol.
Figure 3:
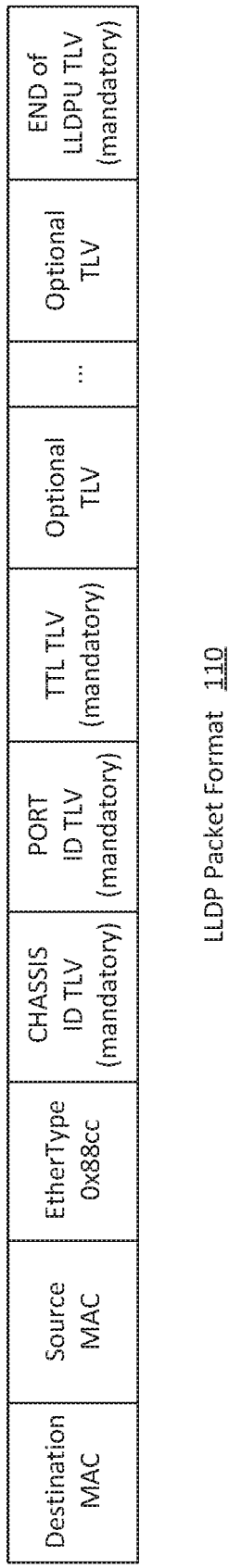
FIG. 3 illustrates an example LLDP packet format.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

The conventional topology discovery mechanisms can suffer from several built-in vulnerabilities, since they have been adopted from traditional networks, that lead to different attacks which target the controller's view of the network topology in SDN. Many attacks target flaws in the OpenFlow Discovery Protocol (OFDP), which utilizes Link Layer Discovery Protocol (LLDP) to discover the links between switches. These attacks can "poison" the controller view of the network topology. A controller may discover an inconsistent or erroneous network topology without being aware of it. Thus, the whole network can be in danger and full of wrong routing decisions, load balancing issues, a target of MITM and DOS attacks, loops, black-holes, etc.

Although some solutions exist to mitigate these problems to some extent, for example by extending functionalities of the SDN controller or modifying the OFDP protocol, they do not completely address the problem of malicious switches that can create a fake topology in the view of the SDN controller. To overcome these issues, the controller (or its applications) should validate the data plane links, i.e. the connector links between the switches.

There are two categories of work in verification of switch links in the SDN environment that will be discussed: SDN Topology Poisoning Attack Prevention and OFDP Security Enhancement.

SDN Topology Poisoning Attack Prevention Mechanisms

In some solutions, two new network topology poisoning attacks are introduced by abusing the flaws in current Host Tracking and Link Discovery services in OpenFlow controllers, namely: Host Location Hijacking and Link Fabrication attacks. An automated tool is proposed as an extension to the OpenFlow controller which checks precondition and postcondition to verify the legitimacy of host migration and to switch port properties to prevent the mentioned attacks. To verify the discovered links, the tool utilizes a cryptography hash function to add the signature of switch DPID and port number in an extra TLV field of an LLDP packet to ensure its integrity. Although this method verifies the host migration correctness and adds authentication to LLDP packets, the tool cannot verify the link created by a malicious host/switch that relays the LLDP packet along with its signature to the next switch. Also, the tool relies on host-generated packets to detect the LLDP packets sent from a host that might poison the network view. However, if the malicious host does not generate any packets and just listens to LLDP packets and relays them to the next host, it can bypass the tool to generate a fake link and that link will not be verified.

In another solution, to detect network topology attacks, flow graphs are introduced which can be leveraged to model the whole network topology and data plane. This approach assumes that the communications from controller to switches are trusted so they build the flow graphs based on only FLOW_MOD packets. This solution verifies defined polices and finds violations as well as attacks on network topology and data plane. Addressing a network topology poisoning attack is not the primary goal and it covers a wider range of attacks. But in the presence of malicious hosts/switches that can create fake links in the network, there are some potential issues. For example, if a malicious host/switch causes the creation of a fake link in the topology and the controller sends a FLOW_MOD packet based on that new (faulty) topology, then the result will lead to a wrong flow graph even though the packet itself is trusted. Also, this solution cannot detect an attack created by compromised switches that relay the LLDP packets from one port to another.

An authentication solution to LLDP packets has been proposed. This solution adds HMAC of switch ID and port ID to the LLDP packet. This method could prevent the hosts or soft switches from forging LLDP packets to create fake links in the network. However, authenticated LLDP packets solely cannot tackle fake link creation caused by relaying LLDP packets, along with the mentioned HMAC value, utilized by compromised hosts or switches in an SDN.

To detect malicious switches in an SDN, another method has been proposed to tackle active attacks caused by the switch which can lead to incorrect forwarding, packet manipulation and malicious weight adjusting. In this method, a switch is randomly chosen. Then, by installing a flow and using an artificial packet being sent to the target switch, the tool investigates if the target switch acts as it is programmed to upon reception of the packet. This method can randomly select switches and verify their legitimacy. However, it does not provide verification for the links between switches.

OFDP Security Enhancement Mechanisms

In some solutions, a more efficient OFDP protocol is introduced, named OFTPv2, which requires the SDN controller to send just one OFTP_PAKCKET_OUT message containing an LLDP packet to a switch and instructs the switch to advertise the LLDP packet in all its ports instead of sending an OFTP_PAKCKET_OUT message for each port of each switch along with the corresponding LLDP packet and set of instructions. Although OFTPv2 is efficient, it has the same lack of security and fake links can be created without being verified.

Some solutions propose another version, named sOFTDP, to cover the limitations of current OFDP. The main idea of sOFTDP is to transfer the burden of topology discovery from the controller to the switches. It applies minimal changes to OpenFlow switch design so that the switches will be able to detect topology changes and inform the controller by notifying it. Also, the controller is modified to understand the switch notifications. In this proposal, authenticated LLDP packets are used to detect network topology updates in the beginning of a newly added ports or links to the network and, instead of sending LLDP packets periodically in next runs, a Bidirectional Forwarding Detection (BFD) session is established between switches in the network to detect link updates and to notify the controller upon any changes. sOFTDP suffers from similar problems as OFDP and OFDPv2.

To validate the accuracy/correctness of discovered links in an SDN network, some embodiments described herein include incrementally discovering any malicious link(s) that do not exist in the network data plane, but exist in the controller's view of the network, and excluding the fake link from further consideration.

Specifically, some embodiments utilize an active probing method, using an indistinguishable technique of choosing probing packets, in a deceptive manner, to verify the data plane links in an SDN environment. The deceptive method to verify switch links in an SDN environment comes from the fact that a malicious switch or host can deceive the controller by making it gather wrong information about the network topology that can later be used to launch several severe attacks. In some embodiments, a similar approach will be applied to malicious switches or hosts to deceive them back and verify the validity of discovered links between switches. To this manner, the deception for link verification should be configured in such a way that malicious hosts/switches cannot distinguish any step of the verification method that is being performed. This tool is not necessarily included as part of the controller, so regardless of the type of the controller, this mechanism can be deployed with any type of controller in any type of SDN environment.

Some embodiments include using a "deceptive" active probing verification approach which will be referred to as "Deceptive Link Verifier (DLV)" to verify OpenFlow based SDN switch links. DLV can be used to analyze the messages travelling between control and data link layer to select and generate probing/verification packets. The probing packets can be used to verify the validity of switch links in the data plane.

It will be appreciated that the OpenFlow protocol will be used for illustrative purposes. The embodiments and mechanisms described herein are not limited to any specific protocol and/or messaging format.

In OpenFlow, when packets are received by the data path (e.g. by a switch) and sent to the controller, they use the OFTP_PACKET_IN message. OFTP_PACKET_IN is a mechanism for the switch to send a captured packet to the controller. There are two reasons to forward a data packet to the controller: as an explicit action as a result of a match asking for this behavior, or from a miss in the match (e.g. flow) tables. The OFTP_PACKET_IN message can be considered a request for packet handling instructions associated with the captured packet.

The format of a conventional OFTP_PACKET_IN includes a header followed by a buffer ID. The buffer ID is a unique value used to track the buffered packet. The length of the captured packet is indicated by total_len. The port the packet was received on is indicated by in_port. The reason field indicates why the packet has been captured and forwarded. Finally, the captured portion of the packet is included.

Some embodiments can utilize a property that will be referred to as the "indistinguishability property" that is associated with a probing packet. An objective of this property is to make a probing packet indistinguishable from any other normal host-generated packet. So, it may be useful to choose the probing packets to be very similar to the host-generated packets that are already traversing the network. Suppose a specific packet type is selected for link verification, for example LLDP packets that are already being used. A malicious switch could then simply detect them and drop or forward them to another switch.

In some embodiments, the probing packets are selected from a pool of packets that are being sent between hosts. Note that not all host generated packets can be used as probing packets. Host generated packets that have already been seen in the network can be chosen, therefore, making it difficult for a malicious switch to distinguish it from normal traffic. This is a key factor for a probing packet to hold the "indistinguishability property".

To hold the indistinguishability property, DLV can generate forged packets and forward them to selected switches to verify the links between them. More specifically, the DLV probing packets are forwarded in a way that no switch can distinguish if those packets are the usual packets traveling from one host to another, or if they are verification packets intended to verify the links between them. The generation of these packets should be performed intelligently so that a malicious user cannot infer any useful information from them to be used later to deceive the controller again. The verification mechanism can study the traffic passing through the network switches and choose the desired packets accordingly to send them in an appropriate way, i.e., when to send and with which specification(s).

Figure 4:
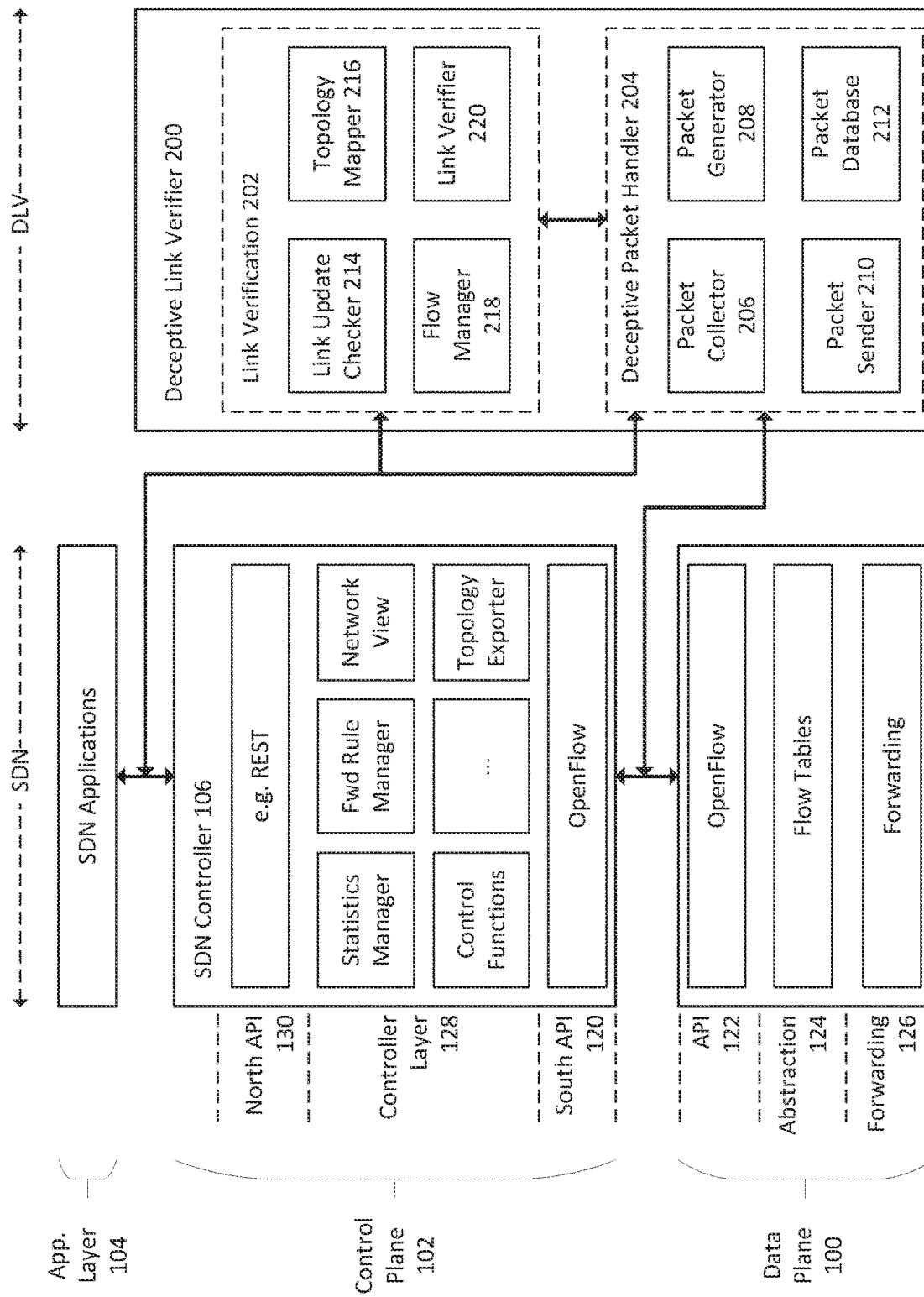
FIG. 4 illustrates an example SDN and DLV architecture.

FIG. 4 illustrates an example SDN and DLV architecture. As previously described, the SDN controller 106 communicates and sends instructions to the data plane 100 through a southbound API 120 to the, e.g. OpenFlow, API 122 of the data plane 100. Data path 100 nodes can include abstraction 124 (e.g. flow tables) and forwarding 126 elements. SDN controller 106 can include various controller layer 128 elements (e.g. statistics management, forwarding rule management, network view database, other control functions, topology exporter, etc.).

To enable DLV to communicate with the data plane 100, the DLV device 200 can utilize the northbound API 130 of the SDN controller 106 to gather required information or to send instructions to and from the data plane 100. DLV 200 can also include modules to listen to communication messages on the southbound API 120 between the control plane 102 and data plane 100. DLV can be considered to have two main parts. The first part is mainly responsible for the link identification and link verification and will be referred to as the Link Verification 202 function. The second part, referred to as the Deceptive Packet Handler 204 function, performs packet collection, packet generation and packet transmission through the Packet Collector 206, Packet Generator 208 and the Packet Sender 210 modules, respectively. The Deceptive Packet Handler 204 can further include Packet Database 212 for storage. Each module will be described in more detail.

Those skilled in the art will appreciate that the DLV 200 mechanism can be implemented as a network node included in the SDN controller 106. Alternatively, the DLV 200 mechanism can be implemented in a node separate from, but in communication with, the SDN controller 106 without departing from the scope of the embodiments described herein.

As illustrated in FIG. 4, Link Verification 202 can include four different functions or modules: Link Update Checker 214, Topology Mapper 216, Flow Manager Application 218 and Link Verifier 220.

Link Update Checker 214

The first step in verifying the switch links is to determine which link should be verified. As discussed, many SDN controllers utilize the OFDP to discover the underlying network topology which can be correct or incorrect due to the presence of malicious hosts or switches in the network.

Any topology update is reported to DLV for link verification. Link Update Checker communicates with the SDN controller and informs the Link Verification of any changes made to the network. This module can be installed from the instantiation of the network to verify the entire topology as it grows in an incremental manner.

Topology Mapper 216

Whenever there is an update to the network topology, the Link Update Checker can detect and report it to the Topology Mapper module which maintains a dynamic tree to locally store the up-to-date topology information. The tree stores the information associated with data plane devices, if it is a host or a switch or a link, along with their specifications, e.g., their status that are "up/down", and other useful information such as "Device IDs" and their "Port IDs", etc. This stored information can be subsequently used by the Link Verifier to query about the virtual network topology and different link status. Also, the tree can be responsible for storing the status of nodes and links and is used as a report on links and switches' status of their validity to system administrators.

Flow Manager Application 218

This application is responsible for communicating with the SDN controller via the northbound API for querying the flows and statistics of a given switch and installing the given flows on a given switch.

Link Verifier 220

The primary task of Link Verification is performed via the Link Verifier module. Based on the input data from Link Update Checker, the Link Verifier communicates with the Topology Mapper module to get the link endpoints and query the flows and their statistics via the Flow Manager Application.

Figure 5:
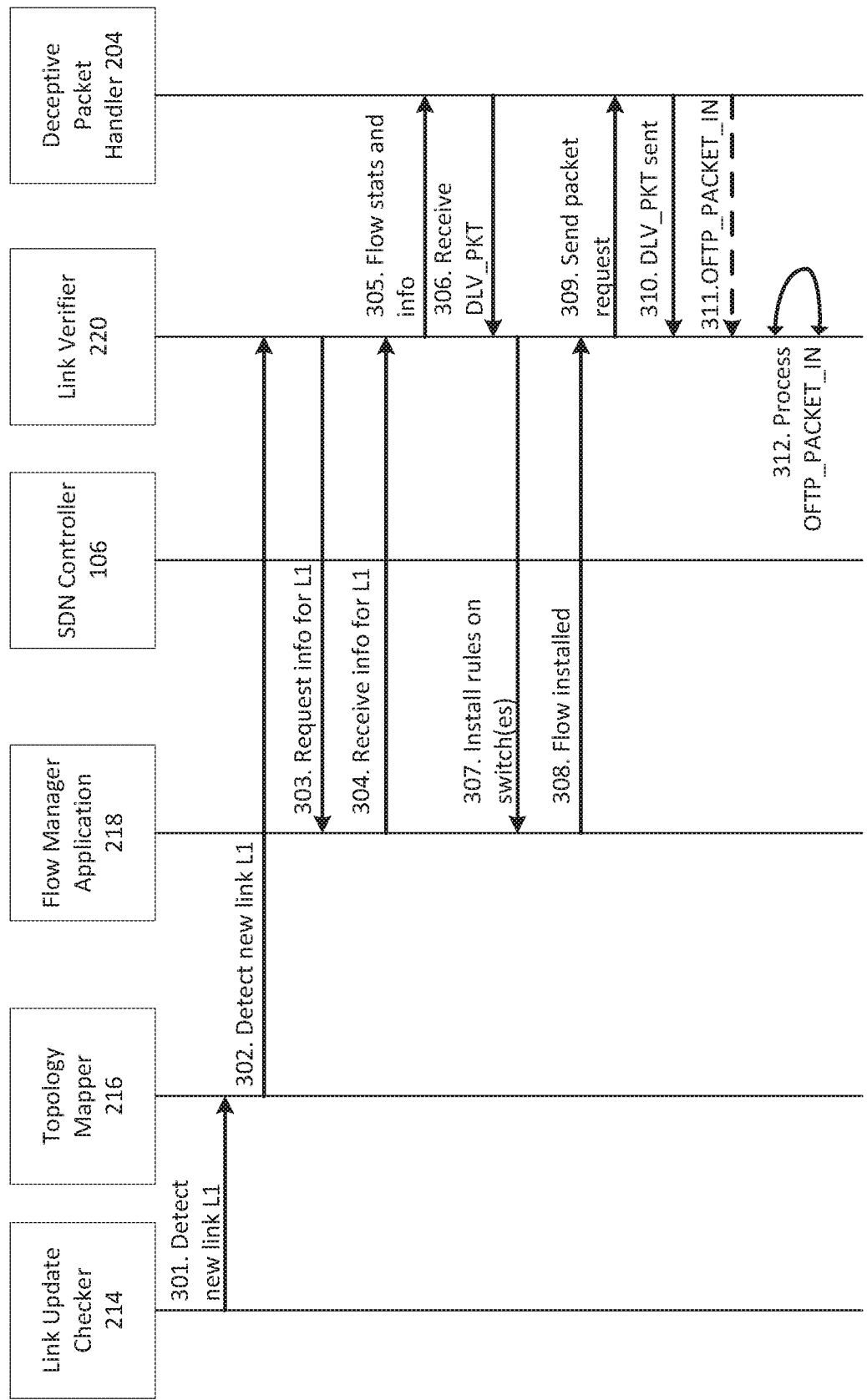
FIG. 5 is a sequence diagram illustrating an example link verification procedure.

FIG. 5 is a sequence diagram illustrating an example link verification procedure. The Link Update Checker 214 detects a new link, L1, has been added to the network and forwards it to the Topology Manager 216 (step 301). The detected link L1 is forwarded to the Link Verifier 220 for verification (step 302).

After the Link Verifier 220 queries the switch flows and statistics of a desired link through the Flow Manager Application 218 (steps 303 and 304), the next step is to send the link information along with the switches' flows and statistics to the Deceptive Packet Handler 204 (step 305). Upon sending the request to Deceptive Packet Handler 204, a packet will be generated and sent back to the Link Verifier 220 (step 306). This packet is the deceptive probing packet, DLV_PKT, which will be used to investigate the validity of a link. Each DLV_PKT is designed for a specific link, since it is customized for specific switch link investigation. This information, i.e., which link is to be investigated with which packet along with the result of investigation, can be saved inside a local database in the Deceptive Packet Handler 204 module.

Utilizing the link information (e.g. link endpoints and their connecting ports) and the returned DLV_PKT packet from the Deceptive Packet Handler 204, the Link Verifier 220 will install a flow, with the help of the Flow Manager Application 218, on the source endpoint of the link that is under investigation to forward the generated packet on its outgoing port towards the destination endpoint switch of the link being investigated (steps 307 and 308). This flow is generated to forward a specific DLV_PKT towards another switch, which will be deleted from the switch after successful round of investigation of the given link.

The Flow Manager Application 218 can install the flow on a given switch, in some embodiments via the SDN controller 106, (step 307) and report to the Link Verifier 220 upon successful installation of the given flow on the given switch (step 308). Once the Link Verifier 220 module is informed of successful installation of the flow on the target switch, Link Verifier 220 can communicate (step 309) with the Packet Sender in the Deceptive Packet Handler 204 to request to send the packet to the source switch of the link under investigation. This can be done by communicating through the northbound API of the SDN controller 106. The Link Verifier 220 can wait until it receives the acknowledgement response from the Deceptive Packet Handler 204 (step 310), within a predetermined time threshold.

In an SDN environment, each switch has multiple tables of flows. A switch can be in reactive mode (e.g. the flows are installed based on the received packets and the communications with the SDN controller), proactive mode (e.g. the flows are installed on the switch by the SDN controller upon the switch being added to the network) or hybrid mode (e.g. a combination of both). In any case, whenever a new packet is received by an OpenFlow switch, if there is no match for the packet in flow tables of the switch, the packet will be forwarded to the SDN controller for further instruction.

Hence, after sending a deceptive probing packet (DLV_PKT) to a switch (e.g. the source endpoint of the link), the switch will forward the DLV_PKT towards the destination endpoint of the link and, since DLV has already installed a flow on the source endpoint switch to forward the DLV_PKT, it will not be forwarded to the controller. However, the destination endpoint of the link under investigation does have any knowledge about the incoming DLV_PKT, and hence will not find any flow to match with the packet, it will generate an OFTP_PACKET_IN including the DLV_PKT as its payload and forward it to the controller for instruction.

At this point, if/when the Deceptive Packet Handler 204 receives an OFTP_PACKET_IN message with a payload of the DLV_PKT, it can inform the Link Verifier 220 by sending the packet to it (step 311). This can be accomplished by listening to the OpenFlow communications between the SDN controller 106 and the data plane. Then the Link Verifier 220 can examine the OFTP_PACKET_IN message, including the DLV_PKT, and match it with the link that the packet was designed for. Otherwise, if the packet is dropped for any reason, after a certain timeout, the Link Verifier 220 will be informed with a timeout message for the given packet that had been sent for investigating a switch link. Based on this information, the Link Verifier 220 can decide on the validity of a switch link (step 312).

Accordingly, there are three possible verification results that can be determined by the Link Verifier 220. First, if the DLV_PKT is sent back from the destination endpoint switch of the given link (as determined by the DPID field of a OFTP_PACKET_IN message containing the ID of a sender switch), the link is verified and marked as "Validated".

In the second case, the DLV_PKT is sent back from a switch/node other than the destination endpoint of the given link. In this case, the link and its sender switch can be marked as potentially "malicious". This can happen when there is a hidden switch between two switches of a link that relays the LLDP packets to poison the network view of the controller. However, since DLV does not rely on LLDP packets, and because the DLV_PKTs are indistinguishable, the malicious switch can be deceived and identified.

In the third case, the DLV_PKT is not received by the Packet Collector for any reason (e.g. it is dropped due to congestion or link loss possibilities), and the link will stay in a "Not-Validated" state until the next round of investigation.

Returning to FIG. 4, the Deceptive Packet Handler 204 can further include several functions or modules, including: Packet Collector 206, Packet Generator 208, Packet Sender 210 and Packet Database 212.

Packet Collector 206

This module can include three functions. First, it collects OFTP_PACKET_IN messages that contain host generated packets in their payload and stores them in its local database, namely as PKT_DB. Second, it collects OFTP_PACKET_IN messages that have a DLV_PKT in their payload and reports them to the Link Verifier. Third, it reports the requested packets to the Packet Generator and Link Verifier modules, which will be discussed further.

All OFTP_PACKET_IN messages can be collected and a pool of packets can be built such that they are used in designing the DLV_PKT packets in a way that a malicious host or switch will not be able to distinguish those packets from a regular host generated packet. For this purpose, the host generated packets that are already traversing the network are "mimicked" (e.g. the DLV_PKTs are based on them). The Packet Collector can capture all OFTP_PACKET_IN messages sent between the SDN controller and OpenFlow switches. It then extracts the header information of the OFTP_PACKET_IN message (e.g. the header information of the payload of the OFTP_PACKET_IN message and its size) and stores it in its local database 212.

Packet Database 212

The packet database (PKT_DB) 212 can contain rows of entries as shown in FIG. 6. For each entry in PKT_DB, the PKT_ID specifies a unique identifier for each packet that is stored in the database. The PKT_ID is not exposed to outside of DLV since it is count as a secret information which will be used for authentication purposes. PKT_type can contain either Host Packet or DLV_PKT, since OFTP_PACKET_IN messages are collected with host generated packet payloads along with DLV_PKT packets that have been sent for link verification. The Switch_DPID value contains the DPID of the switch that has sent the OFTP_PACKET_IN message. PKT_IN_hdr and Payload_hdr contains the header of the OFTP_PACKET_IN and its payload's header information, consecutively. Link_ID contains the ID of the link that the DLV_PKT has sent to verify its validity. Finally, the Timestamp contains the timestamp that a DLV_PKT is generated.

Packet Generator 208

The Packet Generator module is responsible for generating a deceptive probing packet upon receiving a request from Link Verifier module. Two possible situations may occur upon a receiving a request to generate a deceptive probing packet. First, a link is being investigated for the first time. Second, a link that has been previously investigated is being investigated again, i.e., for further rounds of investigation of a certain link. The Packet Generator can query for the Link_ID of a given under-investigation link from the PKT_DB database to find out if it is the first round of investigation for the given link, by finding the link's ID inside the database, or not.

Packet Sender 210

The Packet Sender module can communicate with the Link Verifier and Packet Generator to utilize the northbound API of the SDN controller to instruct the SDN controller to send a packet towards a target switch. The procedure is similar to as discussed herein.

Figure 7:
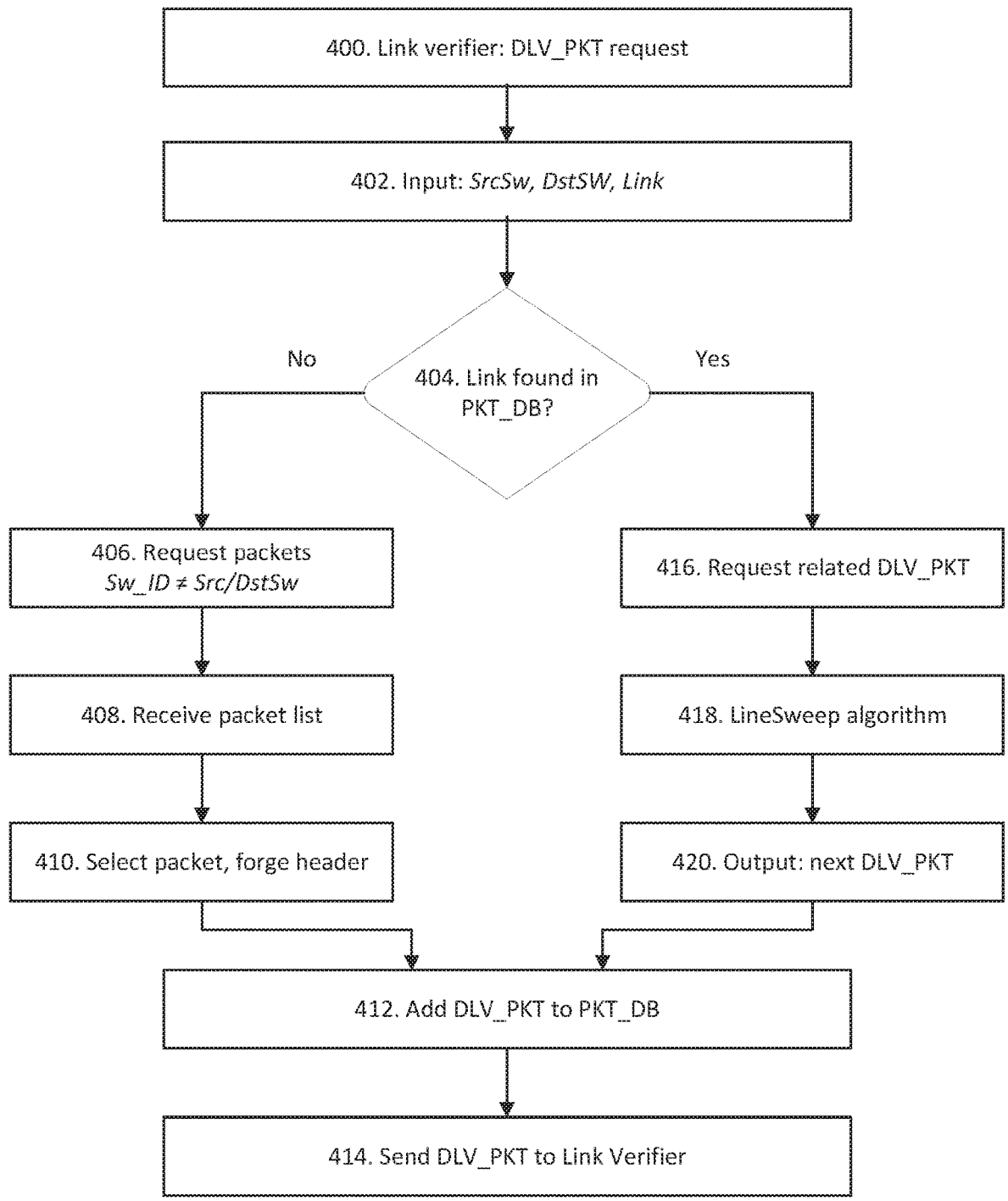
FIG. 7 is a flow chart illustrating an example method for probing packet generation.

FIG. 7 is a flow chart illustrating an example method for probing/verification packet generation. The Packet Generator receives a request to verify a link (step 400). The selected link can be identified by parameters such as the source switch/node (SrcSw), destination switch/node (DstSw) and Link ID (step 402). The packet database is queried to determine if the link has been investigated or not (step 404).

In the first scenario where the link has not been investigated, the Packet Generator communicates with the Packet Collector to request at least one packet from the database (step 406) and to generate a DLV_PKT based on it. The packet is generated in accordance with the switch endpoints of the link that is under investigation. The DLV_PKT should not be any of the already sent packets from those switches, so the Packet Collector can search its database and inform the Packet Generator of packets that do not have the Switch_DPID of the link endpoint switches, i.e., the endpoint switches of the link that is under investigation must not appear in the Switch_DPID field of the packet that is selected from the PKT_DB database. The list of the selected packets satisfying the mentioned condition can be sent to the Packet Generator (step 408). The Packet Generator can then select a packet from the list, forge the source and destination IP addresses and ports to generate the verification packet DLV_PKT (step 410). At this point a unique ID (PKT_ID) can be assigned to the packet for the purpose of packet matching that will be used in subsequent steps. The selected packet does not need to have the payload of the original packet, as DLV does not store packet payloads. Instead, since OpenFlow switches do not process packet payloads, the hash value of the ID of the packet and the timestamp as nonce along with dummy data (e.g. to make the size of the DLV_PKT packet the same as the original host-generated packet) will be put as the payload of the DLV_PKT. This value can be shown formally as Hash(PKT_ID+Timestamp)+dummy. Note that the use of nonce, i.e., timestamp in DLV, can be for security reasons to prevent reply attacks. A copy of the DLV_PKT can be stored in the PKT_DB database along with the link information (e.g. Link_ID) (step 412) and sent to the Link Verifier (step 414). Accordingly, the link verification packet can be generated based on a list of already sent/received packets from the network, and an addition of a hashed value to the payload.

In the second scenario, if there is a match for a given Link_ID inside the PKT_DB database (e.g. the link has been previously investigated), the Packet Generator can query for the related DLV_PKT (e.g. used in the previous investigation) and send the packet to a Line Sweep algorithm (step 416). The Line Sweep algorithm will produce the next probing packet for this link (step 418). Upon receiving the generated DLV_PKT packet (step 420), the payload can be added in the same way as the first scenario. Then the packet will be sent to the Link Verifier (step 414) and replaced with the previous DLV_PKT inside the PKT_DB database for the given Link_ID (step 412).

Figure 8:
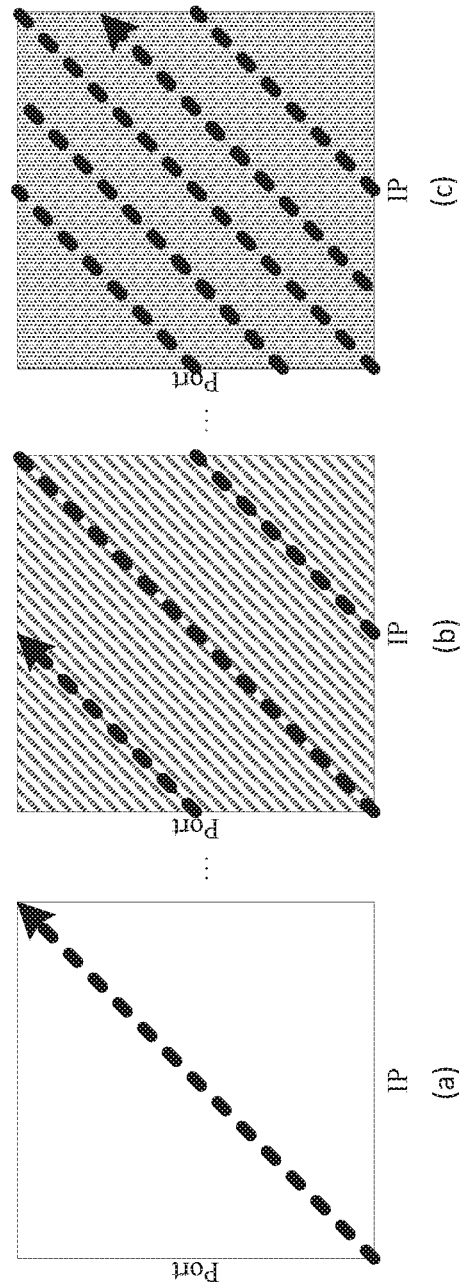
FIG. 8 illustrates an example line sweep mechanism.

As discussed, the Packet Generator can record the latest DLV_PKT packet for each link to be used to generate the next probing packets in future rounds. In some embodiments, after the first round where the packet has been chosen randomly, the packet will be sent to a sweep line algorithm to generate further probing packets. An example line sweep mechanism is illustrated in FIG. 8. Conventionally, a sweep line algorithm is used to solve a problem by sweeping an imaginary line over a dimension stopping at some points. In an example method in which the line sweep algorithm is used to choose probing packets to infer firewall rules, it searches for packet headers in n−1 shapes in an n-dimensional space, by searching for a straight line that is not diagonal but having the characteristics of vertical or horizontal. Packets are generated that cover the sweeping line with a 45-degree angle between starting and ending points. After searching for all packets, another line is selected and the procedure can be repeated until the whole space is covered.

In some embodiments, two planes can be used to choose the DLV_PKT packets' header fields, i.e., IP addresses and ports. One plane can be used for selecting source IP address and source port and another plane for selecting destination IP address and destination port (e.g. x-axis will be the IP address and y-axis will be the port). The IP address and port number will increment sequentially in each line until the end of the line. Then another line will be selected and searched for packet fields till the whole space is searched. The chosen IP addresses and ports will be used in DLV_PKT packets header fields to verify the validity of each link in each round. Also, it is noted that there is no need to exclude the sent packet from the PKT_DB database, as the Packet Collector will collect the already sent DLV_PKT packets and put them in the PKT_DB database. Hence, those packets can be automatically excluded in the decision for the next iteration of sending DLV_PKT packets for a specific switch.

For further illustration, an example of two scenarios—1) when there is no malicious switch or host in the network, and 2) when there is a malicious switch in the network (the same procedure holds for malicious hosts that tend to poison the network view) will be described.

Figure 9:
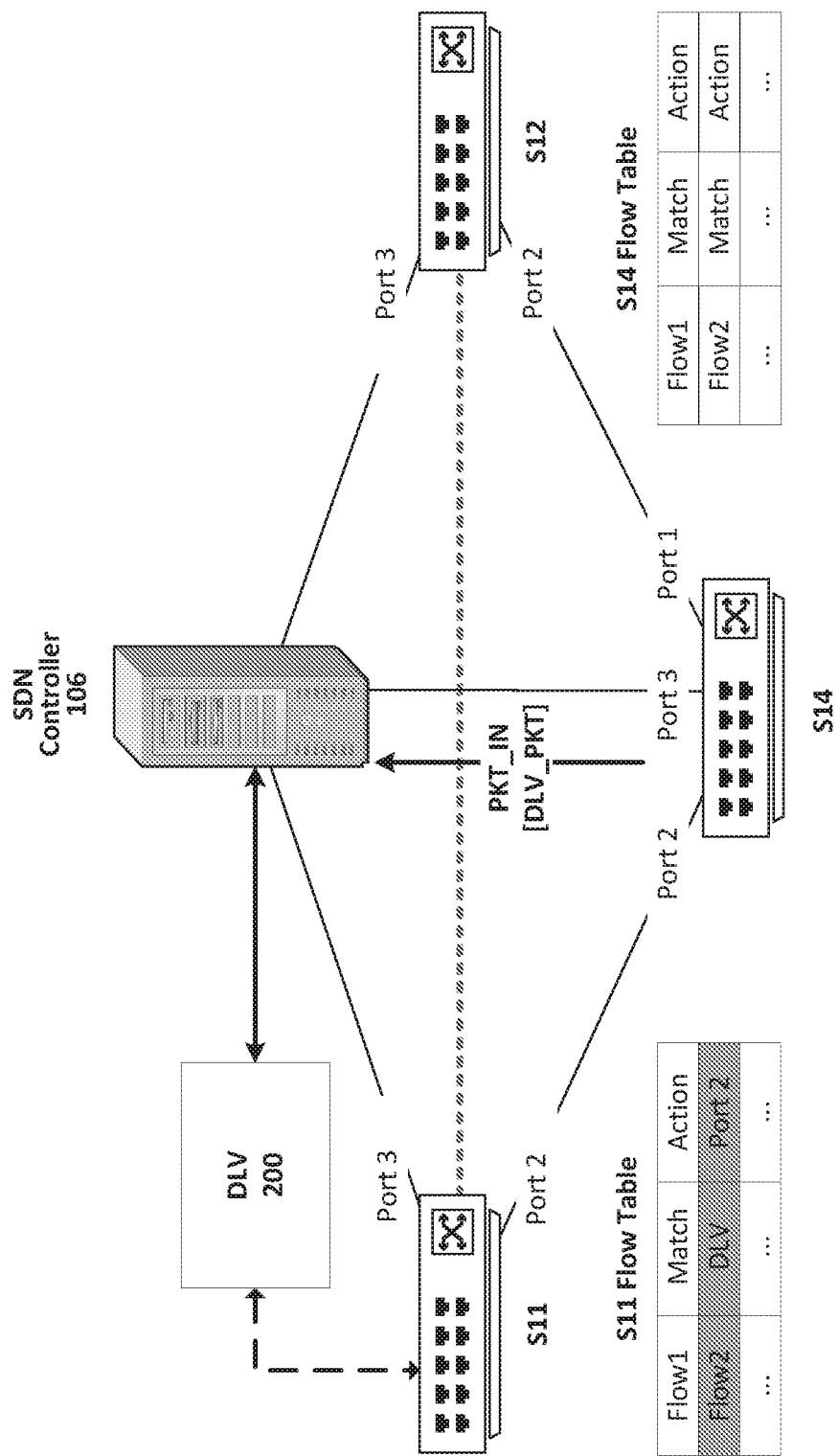
FIG. 9 illustrates an example verification of a newly added link.

FIG. 9 illustrates an example verification of a newly added link using DLV. In the first example scenario, there is no malicious switch between two switches. The link between switches S11 and S14 is a newly discovered link in the network view of the SDN controller 106 and is to be validated. In DLV 200, the first step for link verification is detecting new changes in the network. So, after the new link, i.e., link S11:Port2-S14:Port2 is detected via the Link Update Checker module, the Topology Mapper will be informed of the existence of this new link and the link information will be added to the local dynamic tree with the status of the link set to "Not-Validated". Then the Link Verifier will be informed of the new link that must be validated.

In the next step, the Link verifier will query the flows and statistics of switches S11 and S14 via the Flow Manager Application module and send it to the Packet Generator module. The Packet Collector will search for packets with Link_ID equal to the ID of the link S11:Port2-S14:Port2 and, since the mentioned link is a newly found link, Packet Generator module will query the PKT_DB database with the help of the Packet Collector to find the packets with Switch_ID field value not equal to DPID of switches S11 and S14. Then the Packet Generator will randomly choose a packet from the reported ones, and forge its header information, i.e., source and destination IP addresses and ports and put the hash value of the packet ID and the current timestamp along with dummy information in the payload of the packet as big as the size of the original packet, i.e., Payload_size as shown in FIG. 6. Then the chosen packet which is a DLV_PKT can be sent to Link Verifier module and added to the PKT_DB database.

After the Link Verifier receives the DLV_PKT, it will generate a flow based on the DLV_PKT and the link S11:Port2-S14:Port2 and install the flow on switch S11, i.e., the flow to match the mentioned specific DLV_PKT to forward it on Port2, with the help of the Flow Manager Application. After successful installation of the flow on switch S11, Link Verifier will request the Packet Sender to send the DLV_PKT packet to switch S11, as depicted in FIG. 9. The switch S11 will receive the DLV_PKT, find a match in its flow table for it, and forward the packet on Port2.

The DLV_PKT packet will then be received by switch S14. After a lookup in its tables, switch S14 will not find any flow match for the packet. Therefore, it will encapsulate the DLV_PKT in an OFTP_PACKET_IN message and forward it to the controller 106. At this point, the Packet Collector is continuously listening to controller 106 and data plane communications and, upon receiving an OFTP_PACKET_IN with a DLV_PKT in its payload, it will add the OFTP_PACKET_IN message to the PKT_DB database and send a copy of it to the Link Verifier.

The Link Verifier now can query for the DLV_PKT packets with the Link_ID of the ID of the link S11:Port2-S14:Port2 from the PKT_DB database with the help of the Packet Collector module. After confirming the identity of the DLV_PKT using the hash value of the ID of the DLV_PKT and the timestamp that it has been generated, in its payload and the PKT_ID and the Timestamp from the PKT_DB database, the Link Verifier will match the DPID of the OFTP_PACKET_IN message sender and Switch_ID value in the PKT_DB database for the received DLV_PKT. If both values are the same, then the link S11:Port2-S14:Port2 is validated and marked as "Validated" in the dynamic tree with the help of the Topology Mapper module.

If, within the certain time threshold, the expected packets are not received for verification of a link, either the DLV_PKT or OFTP_PACKET_IN that contains the DLV_PKT has been dropped (this can be because of packet loss in the network due to congestion or other reasons). In this case the link will be maintained as "Not-Validated" until a subsequent round of investigation. After validating the link or deciding to keep the status of the link as "Not-Validated", the flow from switch S11 will be removed utilizing the Flow Manager Application. If the Flow Manager Application is not successful in deleting the flow, the Hard_Timeout of the flow will cause the flow to be removed automatically from the switch S11.

The case was considered when a link has already been investigated for the first round and how the next probing packet is produced using the Line Sweep algorithm for verification of the link in the next round(s).

In the second example scenario, switch S14 is a malicious switch and it has modified its proactive flows to forward LLDP packets that are received, from switch S11, to switch S12. This action will create a fake link between switches S11 and S12 which is indicated with the dashed line between switches S11 and S12 in FIG. 9. Similar to the previous scenario, a DLV_PKT and related flow will be generated and installed on switch S11 to forward the generated DLV_PKT on Port2 of switch S11 to the next hop. The DLV tends to verify the link between switches S11 and S12, since the malicious switch S14 has poisoned the SDN controller's view by forwarding LLDP packets between switches S11 and S12. However, after sending the DLV_PKT, the switch S14 will receive the packet and not switch S12 and, since switch S14 is not able to distinguish the DLV_PKT from a regular host-generated packet, the packet will be encapsulated in an OFTP_PACKET_IN message and forwarded to the controller 106.

The Packet Collector will collect the packet and determine the DLV_PKT inside the OFTP_PACKET_IN message and inform the Link Verifier. The Link Verifier will investigate the packet and determine that the packet that should have been forwarded from switch S12 has been forwarded from switch S14. So, it can inform the Topology Mapper to mark the link as "malicious". In addition to validating the link, malicious switch S14 can be detected, since the packet is not supposed to be received from it. Hence, the switch S14 will also be marked as "malicious". The procedure of link verification can be periodically performed with a random time gap between each DLV run for all discovered links that has been marked "Validated" or "Not-Validated" in previous runs, using different DLV_PKT for each run.

This information can be used to inform the SDN applications of the validity of the links and the trustworthiness of the OpenFlow switches and hosts inside the network so that they can make their management decisions based on this information.

Figure 10:
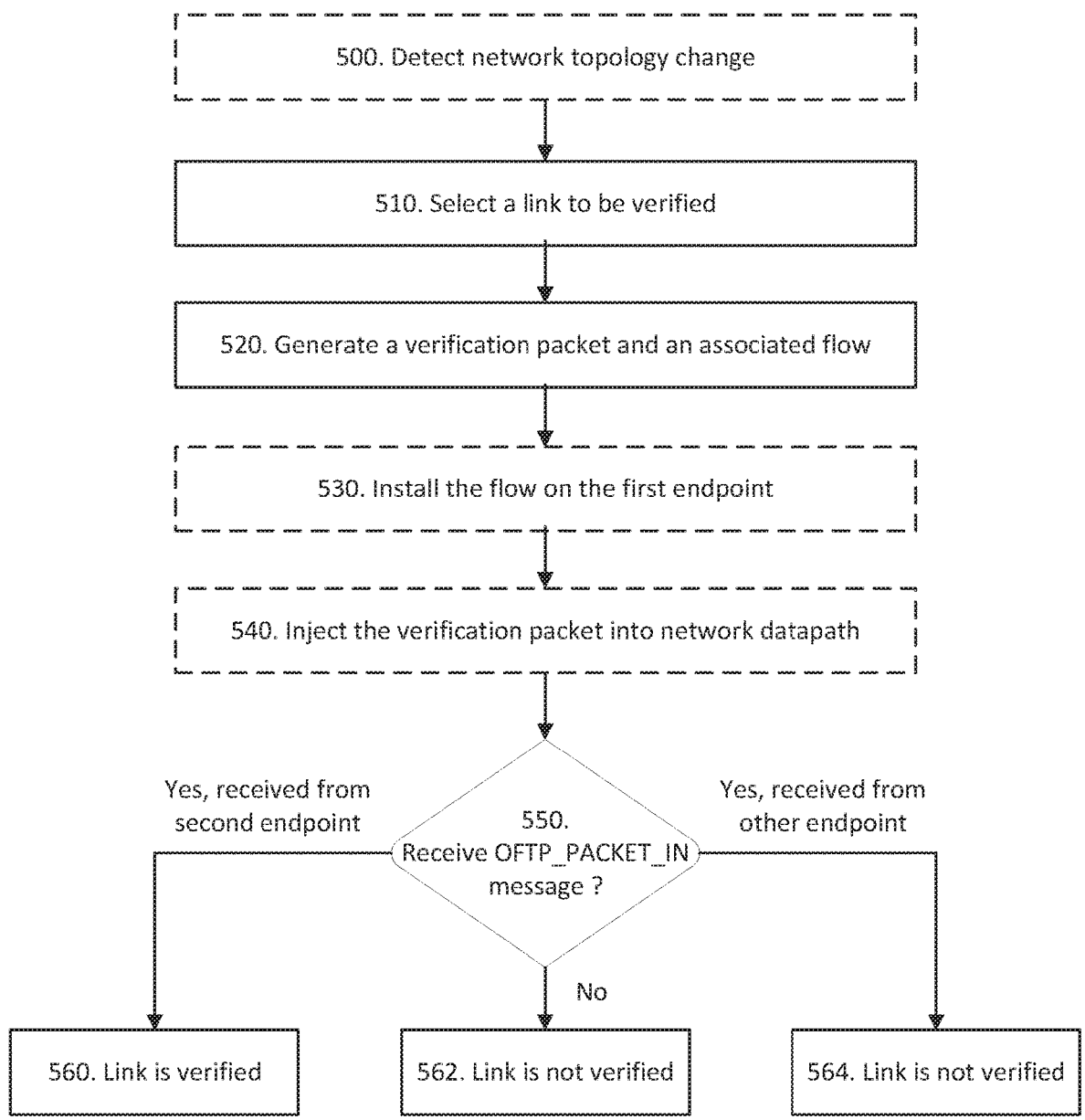
FIG. 10 is a flow chart illustrating an example method performed in a network node.

FIG. 10 is a flow chart illustrating a method for verifying a network link. The method can be performed by a network node such as a network controller (e.g. SDN controller) and/or a link verification device. The method can include:

Step 500 (optional): Detect a network topology change. This can include detecting the addition of a new link between existing network nodes (e.g. switches), for example a link between a first endpoint node and a second endpoint node. Network topology changes can be detected via discovery protocols such as LLDP. This can include receiving an advertisement and/or a LLDP from a network device such as a switch. The network controller can update its stored network topology in accordance with the network topology change.

Step 510: Select a network link to be verified, the network link being between a first node and a second node. In some embodiments, the network link can be selected for verification responsive to detecting a network topology change/update/modification. In some embodiments, the network link is a newly discovered link.

Step 520: Generate a verification packet and an associated packet handling flow.

A verification packet is created which can be customized for the specific link (and endpoint nodes) to be verified. In some embodiments, the verification packet can be generated based on a packet already transmitted to/received by the network. In some embodiments, the verification packet can be generated based at least in part on a packet that has been previously processed by the network. In some embodiments, the previously processed packet is a packet has not been processed (e.g. transmitted or received) by either of the first network node and the second network node. The verification packet can include a unique identifier. In some embodiments, the verification packet can be generated based on a previously used verification packet. The verification packet can be generated to be unique to the selected link. As has been described, the verification packet can be generated by forging header information (e.g. source and destination IP addresses and ports) from the previously processed packet. In some embodiments, a hash value of the packet ID and the current timestamp along with dummy information can be provided in the payload of the verification packet.

A packet handling flow is created instructing the first (e.g. source) node of the link to be verified to forward the generated verification packet (e.g. on an egress port) towards the second (e.g. destination) node of the link to be verified. It will be appreciated by those skilled in the art that the term "flow" represents a packet handling rule to be installed at a network element. The packet handling rule is created specific to the verification packet and the link (and associated link endpoints) to be verified.

Step 530: Install the generated packet handling flow on the first node. The network controller can transmit an instruction (e.g. via a control message) to install the generated flow in a flow table stored on the first node.

Step 540: Inject the generated verification packet into the data plane of the network. The network controller can transmit the generated verification packet directly or indirectly towards the first network node.

Step 550: Determine if a request for packet handling instructions message, such as an OFPT_PACKET_IN message, associated with the generated verification packet has been received. In some embodiments, a request for packet handling instructions can include the generated verification packet. In some embodiments, a received request for packet handling instructions can be compared with a stored list of one or more verification packets that have been injected into the network data path.

Step 560: Responsive to receiving a message requesting packet handling instructions associated with the generated verification packet from the second node, it is determined that the network link is verified. The link can be marked as "verified" or "validated" in the stored network topology.

Step 562: Responsive to not receiving a message requesting packet handling instructions associated with the generated verification packet (e.g. within a predetermined period of time), it is determined that the network link is not verified. The link can be marked as "not validated" in the stored network topology. In some embodiments, the link can be included in a subsequent verification procedure. In some embodiments, a "not validated" link can be removed from the stored network topology.

Step 564: Responsive to receiving a message requesting packet handling instructions associated with the generated verification packet from a node (e.g. a third node) other than the second node, it is determined that the network link is not verified. The link can be marked as "not validated" in the stored network topology. Further, the third node can be identified as potentially malicious. In some embodiments, the "not validated" link and/or the malicious node can be removed from the stored network topology.

After determining the link is verified/not verified (e.g. in steps 560/562/564), the network node can initiate or perform an operational task in accordance with the link being valid/not valid. In some embodiments, operational tasks can include: removing the link (and/or endpoint) from the topology, denying service to the link (and/or endpoint), adding the link/node to a whitelist, adding the link/node to a blacklist, modifying the network topology, etc. For example, after verification, if a link is determined to be fake, the link can be disabled, removed or re-configured. For example, after verification, if a link is determined to be valid, the link can be enabled or confirmed as legitimate in the stored network topology.

It will be appreciated that one or more of the above steps can be performed simultaneously and/or in a different order. Also, some steps can be optional and can be omitted in some embodiments.

Figure 11:
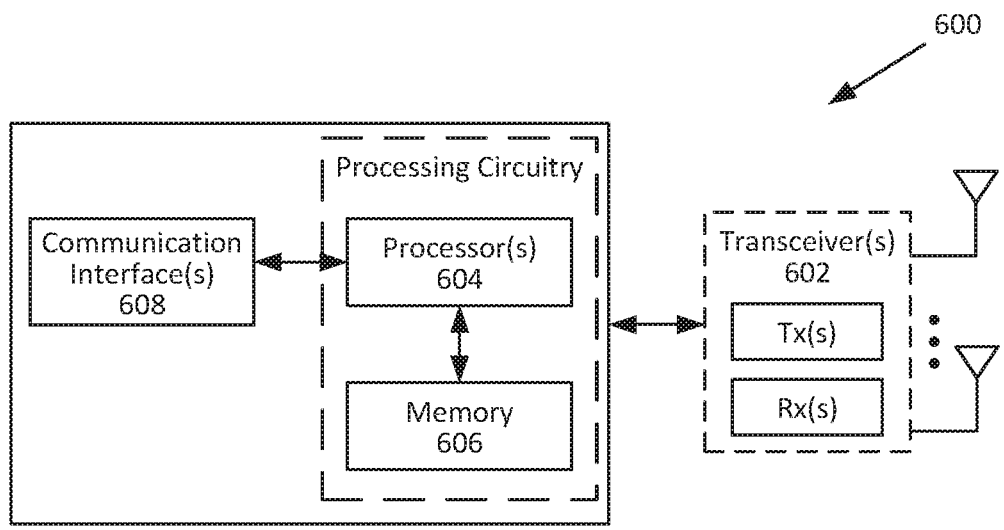
FIG. 11 is a block diagram of an example network node.

FIG. 11 is a block diagram of an exemplary network node 600, in accordance with certain embodiments. Network node 600 can be an network controller, such as a SDN controller, and/or a verification device as described herein. Network node 600 may include one or more of a transceiver 602, processor 604, memory 606, and network/communication interface 608. In some embodiments, the transceiver 602 facilitates transmitting wired/wireless signals to and receiving wired/wireless signals from endpoint devices, such as switches, (e.g., via transmitter(s) (Tx), receiver(s) (Rx), and antenna(s)). The processor 604 executes instructions to provide some or all of the functionalities described above as being provided by a network node 600, the memory 606 stores the instructions executed by the processor 604. In some embodiments, the processor 604 and the memory 606 form processing circuitry. The network interface 608 communicates signals to backend network components, such as a gateway, switch, router, Internet, Public Switched Telephone Network (PSTN), core network nodes or radio network controllers, etc.

The processor 604 may include any suitable combination of hardware to execute instructions and manipulate data to perform some or all of the described functions of network node 600, such as those described above. In some embodiments, the processor 604 may include, for example, one or more computers, one or more central processing units (CPUs), one or more microprocessors, one or more application specific integrated circuits (ASICs), one or more field programmable gate arrays (FPGAs) and/or other logic.

The memory 606 is generally operable to store instructions, such as a computer program, software, an application including one or more of logic, rules, algorithms, code, tables, etc. and/or other instructions capable of being executed by a processor. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 608 is communicatively coupled to the processor and may refer to any suitable device operable to receive input for network node 600, send output from network node 600, perform suitable processing of the input or output or both, communicate to other devices, or any combination of the preceding. The network interface 608 may include appropriate hardware (e.g., port, modem, network interface card, etc.) and software, including protocol conversion and data processing capabilities, to communicate through a network.

Other embodiments of network node 600 may include additional components beyond those shown in FIG. 11 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Figure 12:
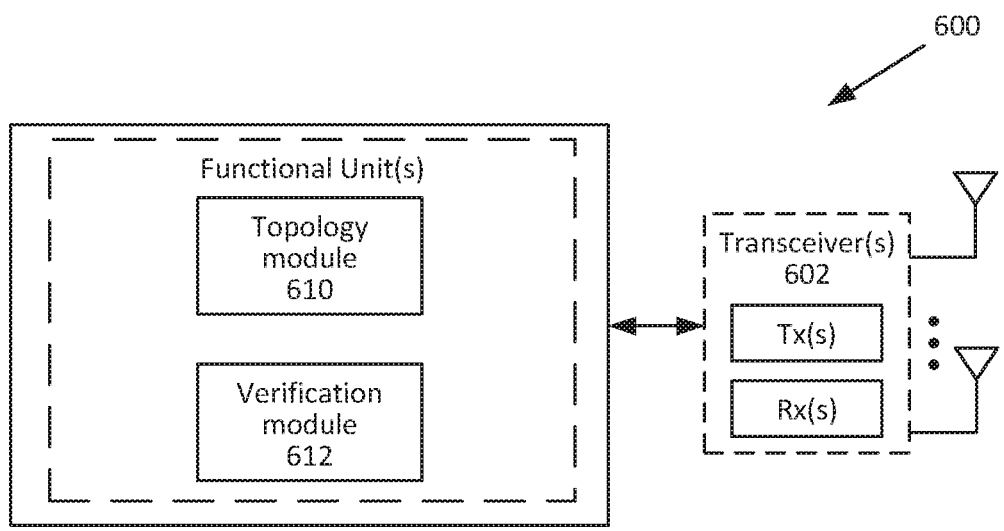
FIG. 12 is a block diagram of an example network node with modules.

In some embodiments, the network node 600, which can be, for example, a network controller and/or a verification device, may comprise a series of modules configured to implement the functionalities of the network node 600 described above. Referring to FIG. 12, in some embodiments, the network node 600 can comprise a topology module 610 for selecting a network link for verification and a verification module 612 for generating a verification packet and an associated flow for determining if the selected network link is valid or not valid.

It will be appreciated that the various modules may be implemented as combination of hardware and software, for instance, the processor, memory and transceiver(s) of network node 600 shown in FIG. 11. Some embodiments may also include additional modules to support additional and/or optional functionalities.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

The invention claimed is:

1. A method for link verification by a network controller, the method comprising:
   selecting a link between a first network node and a second network node for verification;
   generating a verification packet and a packet handling rule associated with the selected link, the packet handling rule indicating to forward the verification packet towards the second network node, wherein the verification packet is generated based at least in part on a packet previously processed by the network;
   installing the generated packet handling rule on the first network node;
   injecting the generated verification packet into a data path of the network; and
   responsive to receiving a request for packet handling instructions associated with the verification packet from a node other than the second network node, determining that the link is not verified.

2. The method of claim 1, wherein the link is selected for verification responsive to detecting a network topology change.

3. The method of claim 2, wherein the network topology change includes an addition of the link between the first network node and the second network node to the network.

4. The method of claim 1, wherein the previously processed packet has not been processed by either of the first network node and the second network node.

5. The method of claim 1, wherein the generated verification packet is unique to the selected link.

6. The method of claim 1, wherein installing the generated packet handling rule includes transmitting a control message to the first network node.

7. The method of claim 1, wherein injecting the generated verification packet into the data path of the network includes transmitting the verification packet to the first network node.

8. The method of claim 1, further comprising, waiting a predetermined period of time to receive a request for packet handling instructions associated with the verification packet.

9. The method of claim 1, further comprising, responsive to receiving a request for packet handling instructions associated with the verification packet from the second network node, determining that the link is verified.

10. The method of claim 1, further comprising, responsive to not receiving a request for packet handling instructions associated with the verification packet, determining that the link is not verified.

11. The method of claim 1, further comprising, performing an operational task in response to determining that the link is not verified.

12. A network controller comprising processing circuitry configured to:
    select a link between a first network node and a second network node for verification;
    generate a verification packet and a packet handling rule associated with the selected link, the packet handling rule indicating to forward the verification packet towards the second network node, wherein the verification packet is generated based at least in part on a packet previously processed by the network;
    install the generated packet handling rule on the first network node;
    inject the generated verification packet into a data path of the network; and
    responsive to receiving a request for packet handling instructions associated with the verification packet from a node other than the second network node, determine that the link is not verified.

13. The network controller of claim 12, wherein the link is selected for verification responsive to detecting a network topology change.

14. The network controller of claim 13, wherein the network topology change includes an addition of the link between the first network node and the second network node to the network.

15. The network controller of claim 12, wherein the previously processed packet has not been processed by either of the first network node and the second network node.

16. The network controller of claim 12, wherein the generated verification packet is unique to the selected link.

17. The network controller of claim 12, wherein installing the generated packet handling rule includes transmitting a control message to the first network node.

18. The network controller of claim 12, wherein injecting the generated verification packet into the data path of the network includes transmitting the verification packet to the first network node.

19. The network controller of claim 12, further configured to wait a predetermined period of time to receive a request for packet handling instructions associated with the verification packet.

20. The network controller of claim 12, further configured to, responsive to receiving a request for packet handling instructions associated with the verification packet from the second network node, determine that the link is verified.

21. The network controller of claim 12, further configured to, responsive to not receiving a request for packet handling instructions associated with the verification packet, determine that the link is not verified.

22. The network controller of claim 12, further configured to perform an operational task in response to determining that the link is not verified.

* * * * *